United States Patent Office 3,732,318
Patented May 8, 1973

3,732,318
α-CHLOROSULFOXIDES AND PROCESS FOR PREPARATION THEREOF
Shinobu Iriuchijima and Genichi Tsuchihashi, Tokyo, Japan, assignors to Sagami Chemical Research Center, Tokyo, Japan
No Drawing. Filed Feb. 24, 1971, Ser. No. 118,554
Claims priority, application Japan, Mar. 7, 1970, 45/19,213
Int. Cl. C07c *147/00*
U.S. Cl. 260—607 R
4 Claims

ABSTRACT OF THE DISCLOSURE

A new process for the production of α-chlorosulfoxides is described. Sulfoxides are chlorinated with chlorine gas in the presence of pyridine or its derivatives. The process yield α-chlorosulfoxides economically and in a high yield. These compounds are useful as medicines and agricultural chemicals.

BACKGROUND OF THE INVENTION

This invention relates to α-chlorosulfoxide compounds and to a process for preparing the same. α-Chlorosulfoxides have an antibiotic property and are used as medicines and agricultural chemicals. α-Chlorosulfoxides, are also useful as raw materials for synthesizing medicines and agricultural chemicals. Particularly, chloromethylmethylsulfoxide, which is a liquid having high polarity, can be used as an industrial solvent.

It has already been known that α-chlorosulfoxide can be prepared by reacting sulfoxides with p-toluenesulfonyl chloride, iodobenzenedichloride, nitrosylchloride or with t-butyl hypochlorite, etc., in the presence of pyridine. (M. Hojo and Z. Yoshida, J. Am. Chem. Soc., 90, 4496 (1968); M. Cinquini, S. Colonna and F. Montanari, Chem. Comm., 607 (1969); R. N. Loeppky and D. C. K. Chang, Tetrahedron Lett., 5415 (1968); S. Iriuchijima and G. Tsuchihashi, Tetrahedron Lett., 5259 (1969).)

The prior art processes have not, however, proved satisfactory for application to an industrial process because they employ unstable reagents, such as iodobenzenedichloride and t-butylhypochlorite, and relatively expensive reagents, such as nitrosyl chloride and p-toluenesulfonyl chloride.

An extensive study was conducted with a view to finding a process, whereby the desired α-chlorosulfoxides could easily be synthesized. As a result, the inventors of this application have successfully developed a novel process a will hereinunder be explained.

DETAILED DESCRIPTION OF THE INVENTION

This invention relates to a process for preparing α-chlorosulfoxides by chlorinating sulfoxides with chlorine gas in the presence of at least one organic base. It is advantageous to use chlorine gas directly as a starting material for chlorination of sulfoxides.

As regards the organic bases which may be used in the present invention, pyridine, picoline, lutidine and quinoline are preferable. The reaction of the present invention is shown in the following formula:

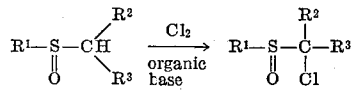

wherein, $R^1$ broadly includes an alkyl group, such as methyl, ethyl and so forth, aryl group, such as phenyl group, substituted alkyl, such as chloromethyl group or a substituted aryl group, such as methyl phenyl, and $R^2$ and $R^3$ may be hydrogen atoms, chlorine atoms, alkyl groups, such as methyl, ethyl etc., aryl groups, such as phenyl group, substituted alkyl, such as chloromethyl group or substituted aryl group, such as methyl phenyl, respectively. According to this invention, a cyclic sulfoxide, such as tetrahydrothiophene-1-oxide having the following formula:

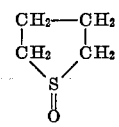

may be easily chlorinated.

As regards the solvents to be used in the present process, any solvent which will not react with the starting material and the final product may be employed. The preferred solvents are aprotic solvents, such as methylene chloride, chloroform and carbon tetrachloride. One mole of chlorine is usually required for one mole of sulfoxide, but an amount less than one mole of chlorine is favorable when any dichloro-compounds tend to be produced. And also, the organic base, such as pyridine, picoline, lutidine and quinoline may be used usually in the amount of two moles or more to sulfoxide.

In practising the present invention, sulfoxide is dissolved in an aprotic solvent, followed by the addition of at least one of the organic bases referred to. Then, the resulting mixture is slowly bubbled by the introduction of chlorine gas while stirring at a temperature of about −40° C.–30° C. The reaction proceeds rapidly and is completed after about 10 minutes of bubbling of equivalent mole chlorine gas to sulfoxide. After the reaction is completed, the organic base may be removed by washing with dilute mineral acid, for example, dilute sulfuric acid. The resulting liquid product is dried with a desiccant, such as anhydrous sodium sulfate, and then the solvent is distilled off, whereby almost pure α-chlorosulfoxide is obtained. The α-chlorosulfoxide thus obtained still contains a little sulfoxide as unreacted material and some dichloro-compounds. Substantially pure α-chlorosulfoxide can be obtained by a purification process, such as distillation, recrystallization, chromatography, activated carbon treatment, etc.

DESCRIPTION OF PREFERRED EMBODIMENTS

The present invention will be further explained in greater detail through the examples to follow. This invention is, however, in no way limited by the examples, which are merely illustrative of some of the essential embodiments of this invention.

EXAMPLE 1

3.56 g. (45.5 mmol) of dimethyl sulfoxide was dissolved in 30 ml. of methylene chloride, followed by adding thereto 7.2 ml. (91 mmol) of pyridine, and the resulting mixture was stirred while cooling the reaction vessel in iced water. Then, 3.30 g. (46.5 mmol) of chlorine gas was slowly bubbled into the mixture over 30 minutes. 8 ml. of 9 N sulfuric acid and then 10 ml. of water were added to the resulting substance, and the substance was extracted with ethyl acetate. After the extract was dried and the solvent distilled off, chloromethyl methyl sulfoxide was obtained in the conversion of 77%. B.P. 65° C./0.05 mm. Hg.

For chlorine—Theoretical value: 31.49%. Actual value: 31.54%.

Incidentally, the structure was confirmed by means of N.M.R. and IR.

EXAMPLE 2

The procedure of Example 1 was repeated except that 2-phenyl-ethyl phenyl sulfoxide, ethyl phenyl sulfoxide, methyl phenyl sulfoxide, methyl p-tolyl sulfoxide or tetrahydrothiophene-1-oxide was used as a starting material. By the procedure, the corresponding α-chlorosulfoxides were obtained. The results are summarized in Table 1.

TABLE 1

α-Chlorosulfoxides:

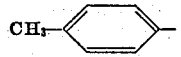

| R¹ | R² | M.P. (B.P.), °C. | Conversion (percent) | Analysis for Cl (percent) Actual value | Theoretical value |
|---|---|---|---|---|---|
| C₆H₅ | C₆H₅CH₂ | 60 | 90 | 13.41 | 13.39 |
| C₆H₅ | CH₃ | 1(83-84/0.1) | 85 | 18.85 | 18.79 |
| C₆H₅ | H | 38-39 | 80 | 20.42 | 20.30 |
| CH₃—⟨⟩— | H | 61.5-62 | 70 | 18.81 | 18.79 |
| —CH₂CH₂CH₂— | | 41-42 | 65 | 25.63 | 25.58 |
| C₆H₅ | C₆H₅ | 122-123 | 60 | 14.27 | 14.14 |

¹ Mm. Hg.

NOTE.—The structures of α-chlorosulfoxides obtained were confirmed by instrumental analysis, such as N.M.R. and I.R.

EXAMPLE 3

1.22 g. (5.3 mmol) of 2-phenylethyl phenyl sulfoxide having the structural formula:

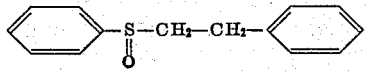

was dissolved in 30 ml. of chloroform, followed by adding thereto 0.11 g. (10.6 mmol) of picoline, and the resulting mixture was stirred at room temperature. Then, 0.37 g. (5.3 mmol) of chlorine gas was slowly bubbled into the mixture over 30 minutes. After completion of the bubbling operation, agitation was continued for an additional 10 minutes, and then, 8 ml. of 9 N sulfuric acid and thereafter 10 ml. of water were added to the mixture, and the resulting substance was extracted with chloroform. After the organic layer was washed and dried, the solvent was distilled off to obtain 1.35 g. of crude crystals of 1-chloro-2-phenylethyl phenyl sulfoxide having the following formula:

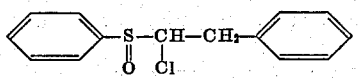

Yield: 96%. Further, by recrystallization from a mixed solvent of benzene and hexane, a pure material having a melting point of 60° C. was obtained. N.M.R. (CDCl₃, δ from TMS): 2.72 (1 H, q.), 3.60 (1 H, q.), 4.64 (1 H, q.), ~7.2 (5 H, m.), 7.43 (3 H, m.) and 7.62 (2 H, m.).

For C₁₄H₁₃ClOS—Theoretical value (percent): C, 63.51; H, 4.95; Cl, 13.39. Actual value (percent): C, 63.36; H, 5.06; Cl, 13.47.

EXAMPLE 4

Into 30 ml. of carbon tetrachloride was dissolved 2.21 g. (14.3 mmol) of ethyl phenyl sulfoxide having the following formula:

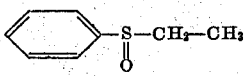

followed by adding thereto 0.22 g. (28.6 mmol) of quinoline, and the resulting mixture was stirred at room temperature. Then, 0.96 g. (13.6 mmol) of chlorine gas was slowly bubbled into the mixture over 30 minutes to react therewith. After the reaction was completed, the product was washed in dilute sulfuric acid, and then, the product was dried by the same procedure as in Example 1. The solvent was distilled off by fractional distillation to obtain almost pure 1-chloroethyl phenyl sulfoxide having the following formula:

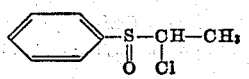

B.P.: 83-84° C./0.1 mm. Hg. Yield: 1.9 g. (70%). N.M.R. (CDCl₃, δ from TMS): 1.62 (3 H, d.), 4.67 (1 H, q.) and ~7.5 (5 H, m.).

For C₈H₉ClOS—Theoretical value (percent): C, 50.92; H, 4.81; S, 16.99.
Actual value (percent): C, 50.78; H, 5.03; S, 17.25.

EXAMPLE 5

9.2 g. (40 mmol) of phenyl-2-phenylethyl sulfoxide and 9.6 ml. (0.12 mol) of pyridine were dissolved in 100 ml. of dichloromethane. Then, over one hour, a solution comprising 50 ml. of carbon tetrachloride in which 5.95 g. (84 mmol) of chlorine gas was dissolved was dropped into the resulting mixture, while cooling the reaction vessel in iced water. Then, the resulting mixture was stirred for another hour at room temperature, after which the product was washed in water, dried and then concentrated under reduced pressure. The resulting concentrated product was dissolved in a mixed solvent of benzene and hexane, and 8.89 g. (30 mmol; yield: 75%) of crystals of 1,1 - dichloro-2-phenylethyl phenyl sulfoxide was obtained from said mixed solvent. M.P. 98.5-99° C.

For C₁₄H₁₂Cl₂OS—Theoretical value (percent): C, 56.20; H, 4.04; Cl, 23.70.
Actual value (percent): C, 56.22; H, 4.07; Cl, 23.61.
IR (Nujol): 1060, 1075, 1085 cm.⁻¹
N.M.R. (δ CDCl₃): 3.67 (2 H, q., J=14), 7.2-7.6 (8 H), 7.7-7.9 (2 H)
Mass: m./e. 298 (M⁺)

EXAMPLE 6

Antitumor test

An antitumor test was conducted with the 1-chloro-2-phenylethylphenylsulfoxide sample prepared by the procedure of Example 3.

Three-million metastatized lung cancer cells were intravenously injected into 10 mice, and 1-chloro-2-phenylethylphenylsulfoxide was further intravenously injected into five of the same mice at the rate of 150 mg./kg. The survival times in days of the mice were noted and the life-prolonging effects were evaluated. The results showed that whereas the average survival time of control mice was 10±1 days, the average survival time of the mice treated with 1 - chloro-2-phenylethylphenylsulfoxide was 15.4 days.

No toxic effect was noted when 1-chloro-2-phenyl-ethylphenylsulfoxide was orally administered to mice at the dose level of 500 mg./kg.

EXAMPLE 7

Hypnotic effect

Twenty mice were grouped into four groupings, A, B, C and D, each one of which comprised five mice and the hypnotic action of the present compound was evaluated. To the mice in group A (control), hexobarbital sodium was subcutaneously administered at the rate of 75 mg./ kg., while the α-chlorobenzene-phenylsulfoxide sample of Example 2 was intraperitoneally administered to mice in group B at the rate of 150 mg./kg. To the mice in group C, 1-chloro-2-phenylethylphenylsulfoxide was intraperitoneally administered at the rate of 150 mg./kg. and, after an interval of 30 minutes, hexobarbitol sodium was subcutaneously administered at the rate of 75 mg./kg. To the mice in group D (control), phenyl-2-chloro-2-phenylethylsulfone was intraperitoneally administered at the rate of 150 mg./kg. and after an interval of 30 minutes, hexobarbital sodium was subcutaneously administered at the rate of 75 mg./kg.

Then, the times in which the righting reflexes of the test mice had disappeared were measured. The results are set forth below.

| Time | Percent increase in time of hypnosis |
|---|---|
| Group of mice: | |
| A — 40 min., 28 sec. | 0 |
| B — 92 min., 12 sec. | 127 |
| C — 81 min., 26 sec. | 101 |
| D — 65 min., 34 sec. | 62 |

We claim:

1. 1-chloro-2-phenylethyl phenyl sulfoxide having the formula:

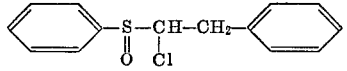

2. A process for preparing an α-chlorosulfoxide comprising chlorinating a sulfoxide having the formula:

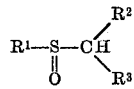

wherein $R^1$ is an alkyl, a halogen-substituted lower alkyl, phenyl, or a lower alkyl substituted phenyl group, and $R^2$ and $R^3$ are hydrogen, chlorine, alkyl, phenyl or alkylphenyl, or $R^1$ and $R^2$, taken together, form a cycloalkyl group, with chlorine gas, up to one mole of chlorine gas being used for each mole of the sulfoxide, in an aprotic solvent at a temperature of from about −40° C. to about 30° C., in the presence of an organic base selected from the group consisting of pyridine, picoline, lutidine and quinoline.

3. The process of claim 2, wherein the sulfoxide is 2-phenylethyl phenyl sulfoxide.

4. The process of claim 3, wherein the solvent is picoline.

References Cited

Loeppky et al.: "Tetrahedron Letters" (1968), No. 52, pp. 5415–18.

Iriuchijima et al.: "Tetrahedron Letters" (1969), No. 60, pp. 5259–62.

Aycai: "Chem. Abstracts," vol. 53 (1959), p. 11287g.

LEWIS GOTTS, Primary Examiner

D. R. PHILLIPS, Assistant Examiner

U.S. Cl. X.R.

71—103; 260—609 E; 424—337